(12) United States Patent
Fu et al.

(10) Patent No.: US 9,994,345 B2
(45) Date of Patent: Jun. 12, 2018

(54) BIOMIMETIC BAG OPENING DEVICE FOR AUTOMATIC FILLING LINE

(71) Applicant: ANHUI YONGCHENG ELECTRONIC AND MECHANICAL TECHNOLOGY CO., LTD., Liuan (CN)

(72) Inventors: Zhengbing Fu, Liuan (CN); Xinquan Zhang, Liuan (CN); Weidong Wu, Liuan (CN); Jingcheng Xu, Liuan (CN)

(73) Assignee: ANHUI YONGCHENG ELECTRONIC AND MECHANICAL TECHNOLOGY CO., LTD., Anhui Province (CN)

( * ) Notice: Subject to any disclaimer, the term of this patent is extended or adjusted under 35 U.S.C. 154(b) by 582 days.

(21) Appl. No.: 14/609,229

(22) Filed: Jan. 29, 2015

(65) Prior Publication Data
US 2016/0122055 A1    May 5, 2016

Related U.S. Application Data

(63) Continuation of application No. PCT/CN2014/090336, filed on Nov. 5, 2014.

(51) Int. Cl.
*B65B 43/30* (2006.01)
*B25J 15/08* (2006.01)
(Continued)

(52) U.S. Cl.
CPC ............. *B65B 43/30* (2013.01); *B25J 15/00* (2013.01); *B25J 15/0009* (2013.01);
(Continued)

(58) Field of Classification Search
CPC ....... B65B 43/30; B65B 43/465; B65B 67/12; B65B 43/16; B65B 43/26; B65H 3/22;
(Continued)

(56) References Cited

U.S. PATENT DOCUMENTS 1,190,898 A * 7/1916 Hinton .................... B65B 43/30
141/312
3,176,979 A * 4/1965 Engelmann .............. B65H 3/22
271/18.3
(Continued)

FOREIGN PATENT DOCUMENTS

CN        102180277 A     9/2011
CN        203094534 U     7/2013
(Continued)

OTHER PUBLICATIONS

The International Search Report of corresponding International PCT Application No. PCT/CN2014/090036, dated Jul. 21, 2015.

*Primary Examiner* — Hemant M Desai
*Assistant Examiner* — Eduardo R Ferrero
(74) *Attorney, Agent, or Firm* — J.C. Patents

(57) ABSTRACT

The present invention discloses a biomimetic bag opening device for an automatic filling line, comprising brackets left and right symmetrically arranged on the filling line for filling bags, the symmetrically arranged brackets moving in a horizontal relative motion respectively driven by a pull rod, a push bag plate facing the filling bag provided at a front end of the bracket, a row of gripper holes provided on the push bag plate in the upper and lower of the horizontal level respectively, two rows of grippers provided on the brackets behind the push bag plate and corresponding to the two rows of gripper holes, a gripper drive device driving two rows of grippers open or closed, and grasping fingertips of the grippers projecting or retracting from two rows of the upper and lower of the gripper holes. The present invention solves the problem that woven bags are automatically opened in a full-automatic weighing and packaging device, which can be used for the production of the non-lamination woven bag, semi-lamination woven bag and full-lamination woven bag. The grippers of present invention imitate the human fingers (Continued)

to grip woven bags and separate the bag mouth, the bag mouth can also be closed to prepare for next process after bagging completed, and structure installation and adjustment are convenient.

6 Claims, 5 Drawing Sheets

(51) Int. Cl.
| | |
|---|---|
| *B65H 3/22* | (2006.01) |
| *B65B 43/16* | (2006.01) |
| *B65B 43/46* | (2006.01) |
| *B25J 15/10* | (2006.01) |
| *B25J 15/00* | (2006.01) |
| *B65B 43/26* | (2006.01) |
| *B65B 1/04* | (2006.01) |
| *B65B 65/02* | (2006.01) |

(52) U.S. Cl.
CPC .......... *B25J 15/0071* (2013.01); *B25J 15/08* (2013.01); *B25J 15/086* (2013.01); *B25J 15/106* (2013.01); *B65B 1/04* (2013.01); *B65B 43/16* (2013.01); *B65B 43/26* (2013.01); *B65B 43/465* (2013.01); *B65B 65/02* (2013.01); *B65H 3/22* (2013.01)

(58) Field of Classification Search
CPC .... B25J 25/00; B25J 25/0071; B25J 25/0009; B25J 25/009; B25J 25/0265; B25J 15/00; B25J 15/0009; B25J 15/009; B25J 15/0071; B25J 15/0266; B25J 15/08; B25J 15/086; B25J 15/106
USPC .................................. 53/570, 384.1
See application file for complete search history.

(56) References Cited

U.S. PATENT DOCUMENTS

| | | | | | |
|---|---|---|---|---|---|
| 3,225,514 | A | * | 12/1965 | Inglett | B65B 43/18 53/386.1 |
| 3,386,763 | A | * | 6/1968 | Ottaway | B65H 3/22 271/18.3 |
| 3,402,833 | A | * | 9/1968 | Pershing | B65H 3/22 221/216 |
| 3,442,505 | A | * | 5/1969 | Szentkuti | B65H 3/22 271/1 |
| 3,465,499 | A | * | 9/1969 | Nelsoner | B65B 43/30 53/386.1 |
| 3,509,689 | A | * | 5/1970 | Perrin | B65B 43/04 53/384.1 |
| 3,545,166 | A | * | 12/1970 | Johnson | B65B 5/022 53/385.1 |
| 3,583,698 | A | * | 6/1971 | Morton | B65H 3/22 221/216 |
| 3,595,562 | A | * | 7/1971 | Oldroyd | B65H 3/48 271/98 |
| 3,608,890 | A | * | 9/1971 | Littlefield | B65H 3/22 271/21 |
| 3,625,506 | A | * | 12/1971 | Rovin | B65H 3/22 271/18.3 |
| 3,756,587 | A | * | 9/1973 | Lutts | B65H 3/22 271/20 |
| 3,813,094 | A | * | 5/1974 | Walton | B65H 3/22 271/10.01 |
| 3,902,750 | A | * | 9/1975 | Roitel | B65H 3/22 271/18.3 |
| 3,981,495 | A | * | 9/1976 | Bijttebier | A41H 43/02 221/213 |
| 4,008,888 | A | * | 2/1977 | Vinciguerra | B65H 3/22 271/18.3 |
| 4,042,271 | A | * | 8/1977 | Vinciguerra | B65H 3/22 271/18.3 |
| 4,253,292 | A | * | 3/1981 | Lipes | B65B 1/32 177/118 |
| 4,301,842 | A | * | 11/1981 | Kuckhermann | B65B 43/30 141/114 |
| 4,444,384 | A | * | 4/1984 | Keeton | B65H 3/22 271/18.3 |
| 4,505,468 | A | * | 3/1985 | Heisler | B65H 3/22 221/213 |
| 4,510,736 | A | * | 4/1985 | Muller | B65B 1/02 53/284.7 |
| 4,514,962 | A | * | 5/1985 | Ausnit | B65B 39/02 383/35 |
| 4,526,363 | A | * | 7/1985 | Fort | A41H 43/02 271/10.01 |
| 4,534,158 | A | * | 8/1985 | McClosky | B65B 1/02 493/256 |
| 4,561,238 | A | * | 12/1985 | Odom | B65B 43/18 493/125 |
| 4,579,331 | A | * | 4/1986 | Nestler | B65H 3/26 271/18.3 |
| 4,581,874 | A | * | 4/1986 | Rechtsteiner | B65B 43/30 206/484 |
| 4,605,216 | A | * | 8/1986 | DeWitt | B65H 3/22 271/10.01 |
| 4,641,826 | A | * | 2/1987 | van der Weide | B65H 3/22 271/18.3 |
| 4,644,735 | A | * | 2/1987 | Savigny | B65B 43/30 53/384.1 |
| 4,664,161 | A | * | 5/1987 | Sawa | B65B 43/30 141/114 |
| 4,726,170 | A | * | 2/1988 | Sawa | B65B 43/30 53/386.1 |
| 4,795,413 | A | * | 1/1989 | Johnson | B65B 43/30 156/751 |
| 4,874,354 | A | * | 10/1989 | Johnson | B65B 43/30 493/101 |
| 5,005,341 | A | * | 4/1991 | Tetenborg | B65B 43/30 141/114 |
| 5,058,364 | A | * | 10/1991 | Seiden | B65B 43/04 53/385.1 |
| 5,114,132 | A | * | 5/1992 | Arato | B65H 3/22 221/213 |
| 5,115,619 | A | * | 5/1992 | Lieder | B65B 1/34 141/313 |
| 5,129,342 | A | * | 7/1992 | Wirth | B65H 3/22 112/303 |
| 5,142,840 | A | * | 9/1992 | Cappi | B65B 43/30 53/384.1 |
| 5,142,841 | A | * | 9/1992 | Cappi | B65B 43/30 53/384.1 |
| 5,248,177 | A | * | 9/1993 | Jones | B65G 47/90 271/19 |
| 5,273,268 | A | * | 12/1993 | Ogata | B65H 5/08 271/18.3 |
| 5,356,126 | A | * | 10/1994 | Bayer | B65H 3/22 271/10.01 |
| 5,465,951 | A | * | 11/1995 | Burt | B65H 1/04 269/21 |
| 5,951,001 | A | * | 9/1999 | Stradi | B65H 3/22 271/104 |
| 5,987,854 | A | * | 11/1999 | Killinger | B65B 43/123 53/386.1 |
| 6,094,895 | A | * | 8/2000 | Ravizza | B65B 9/13 53/384.1 |
| 6,672,038 | B2 | * | 1/2004 | McGrane | B65B 43/30 53/250 |
| 6,880,310 | B2 | * | 4/2005 | Main | B65B 43/18 53/386.1 |
| 7,392,898 | B2 | * | 7/2008 | Bullock | B65B 1/32 206/221 |
| 7,584,593 | B2 | * | 9/2009 | Murray | B65B 43/30 493/309 |
| 8,104,807 | B2 | * | 1/2012 | Maffeis | B25J 15/0071 294/119.1 |

(56) References Cited

U.S. PATENT DOCUMENTS

| | | | | |
|---|---|---|---|---|
| 8,141,920 B2* | 3/2012 | Butler | .................... | B65B 43/30 |
| | | | | 294/26 |
| 8,714,608 B2* | 5/2014 | Cho | .................... | B25J 15/0071 |
| | | | | 294/207 |
| 9,758,323 B2* | 9/2017 | Werni | .................... | B65H 3/22 |
| 2002/0116898 A1* | 8/2002 | Ikemoto | .................. | B65B 43/30 |
| | | | | 53/386.1 |
| 2004/0103619 A1* | 6/2004 | Droog | .................... | B65B 43/36 |
| | | | | 53/459 |
| 2006/0124433 A1* | 6/2006 | Weir | .................. | B65G 47/1478 |
| | | | | 198/455 |
| 2006/0207225 A1* | 9/2006 | Fukuda | .................. | B65B 43/30 |
| | | | | 53/492 |
| 2009/0146440 A1* | 6/2009 | Buljo | .................... | A01K 17/00 |
| | | | | 294/61 |
| 2009/0308031 A1* | 12/2009 | Koga | .................... | B65B 43/465 |
| | | | | 53/570 |
| 2009/0314386 A1* | 12/2009 | Koga | .................... | B65B 43/465 |
| | | | | 141/314 |
| 2013/0187398 A1* | 7/2013 | Cho | .................... | B25J 15/0071 |
| | | | | 294/61 |

FOREIGN PATENT DOCUMENTS

| | | | |
|---|---|---|---|
| CN | 104058133 A | 9/2014 | |
| JP | H06-122421 A | 5/1994 | |
| JP | H10-053221 A | 2/1998 | |
| JP | 2013-082487 A | 5/2013 | |

\* cited by examiner

US 9,994,345 B2

BIOMIMETIC BAG OPENING DEVICE FOR AUTOMATIC FILLING LINE

CROSS-REFERENCE TO RELATED APPLICATIONS

This application is a continuation of International Application No. PCT/CN2014/090336, filed on Nov. 5, 2014, and the contents of which are hereby incorporated by reference in their entirety.

FIELD OF THE INVENTION

The present invention relates to a biomimetic bag opening device for the automatic filling line, which is a biomimetic bag opening device for material packaging bags unable to be opened by suckers or air.

BACKGROUND OF THE INVENTION

With the development of science and technology, now large granule or powder, etc., material packaging enterprises (such as, rice, flour, feedstuff, fertilizers, etc.) all utilize automated process line, and the full-automatic weighing and packaging device is sufficiently used. Currently, the material bag supply and the bag mouth opening are completed by gripping and adsorbing via a sucker on the full-automatic weighing and packaging device. The granule or powder packages employ PP bags which are knitted vertically and horizontally by approximately 2 mm of woven strips, with very high breathability. Thus the suckers can not be used to open the bag mouth when using the full-automatic weighing and packaging device, and the woven bags must be treated with double-sided lamination processing to solve the problem of breathability, and the woven membrane reduces production efficiency and increases the cost, therefore the full-automatic weighing and packaging device is not universally used by many of the enterprises.

SUMMARY OF THE INVENTION

It is an object of the present invention to provide a biomimetic bag opening device for the automatic filling line, which solves the problems of poor bag sealing, strong breathability, and the lamination greatly increasing the cost of production.

The solutions of the invention are as follows: A biomimetic bag opening device for an automatic filling line, comprising brackets left and right symmetrically arranged on the filling line for filling bags, the symmetrically arranged brackets moving in a horizontal relative motion respectively driven by a pull rod, a push bag plate facing the filling bag provided at a front end of the bracket, a row of gripper holes provided on the push bag plate in the upper and lower of the horizontal level respectively, two rows of grippers provided on the brackets behind the push bag plate and corresponding to the two rows of gripper holes, a gripper drive device driving two rows of grippers open or closed, and grasping fingertips of the grippers projecting or retracting from two rows of the upper and lower of the gripper holes.

Wherein the gripper drive device comprises an active gripping arm and a driven gripping arm connected to the gripper, and a swing arm driven by a drive arm, the swing arm with one end fixedly connected to a first shaft, the first shaft rotating with the swing of the swing arm, a row of gripping arms fixedly mounted on the first shaft, referred to as active gripping arms, also a drive gear provided on the first shaft, a second shaft provided parallel to the first shaft, a row of gripping arms fixedly mounted on the second shaft, referred to as the driven gripping arms, a driven gear provided on the second shaft and corresponding to the drive gear, the drive gear and the driven gear engaged with each other, the swing arm driven by the drive arm to rotate the first shaft, the driven gear rotated by the drive gear of the first shaft, the second shaft rotated by the driven gear, the active gripping arm and driven gripping arm driven open or closed by the rotation of the first shaft and second shaft.

Wherein the drive arm is connected to one cylinder push arm or cylinder push arms or push arms driven by an electrical motor.

Wherein the two sides of the bracket push bag plate on one side are respectively arranged with auxiliary suckers facing the filling bags.

Wherein the sucker face of the auxiliary sucker is retracted into the plane of the push bag plate.

Wherein, the sucker face of the auxiliary sucker is retracted into the plane of the push bag plate by 2 mm to 4 mm.

The present invention solves the problem that woven bags are automatically opened in a full-automatic weighing and packaging device, which can be used for the production of the non-lamination woven bag, semi-lamination woven bag and full-lamination woven bag. The grippers of present invention imitate the human fingers to grip woven bags and detach the bag mouth, the bag mouth can also be closed to prepare for next process after bagging completed, and structure installation and adjustment are convenient.

DESCRIPTION OF THE PREFERRED EMBODIMENTS

Figure 1:
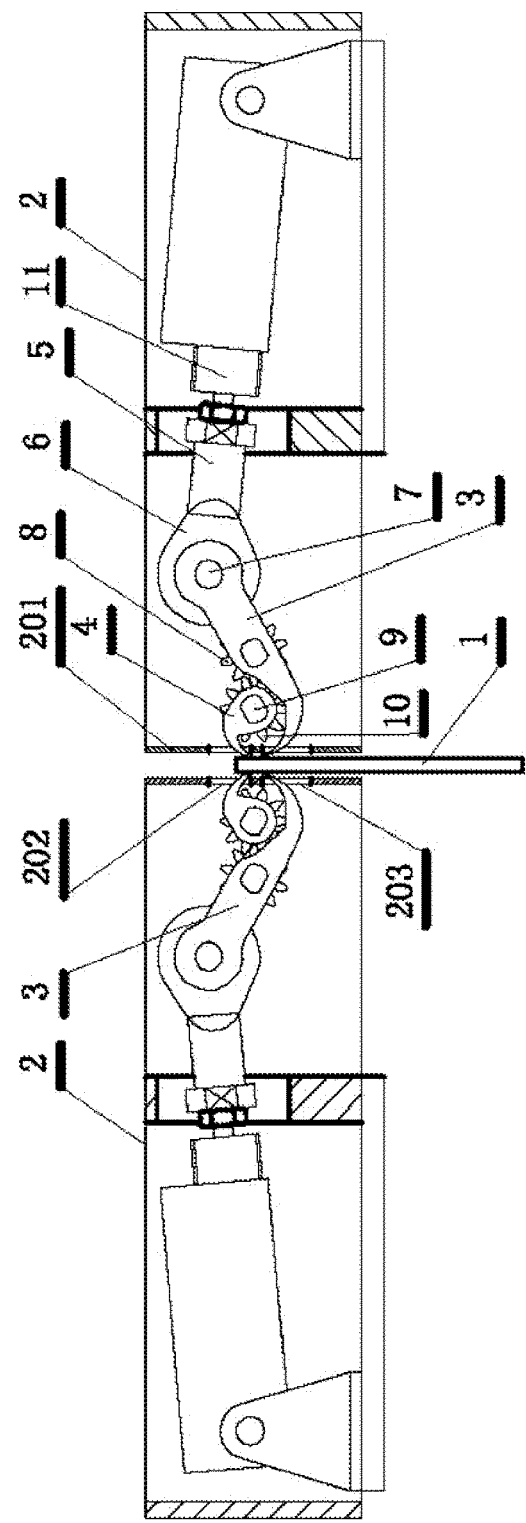
FIG. 1 shows the schematic diagram of the structure of the invention.
Figure 2:
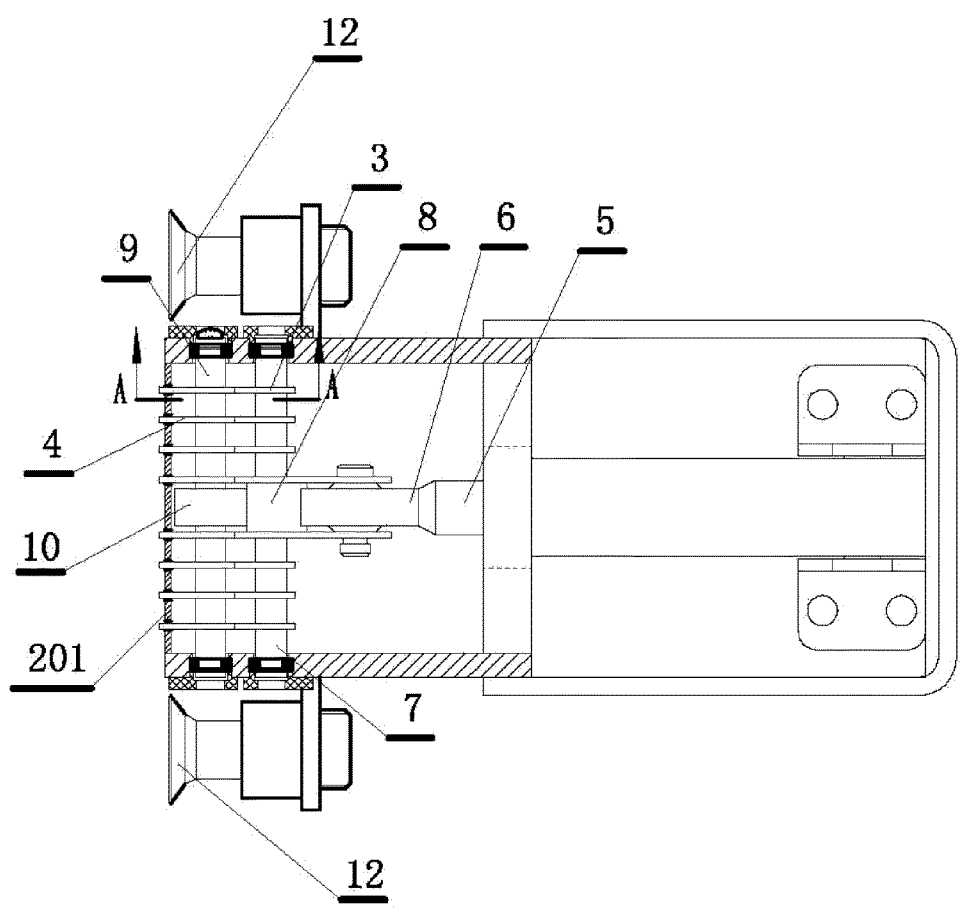
FIG. 2 shows the internal schematic diagram of the structure of the invention, which is a plan view of one side of FIG. 1.
Figure 3:
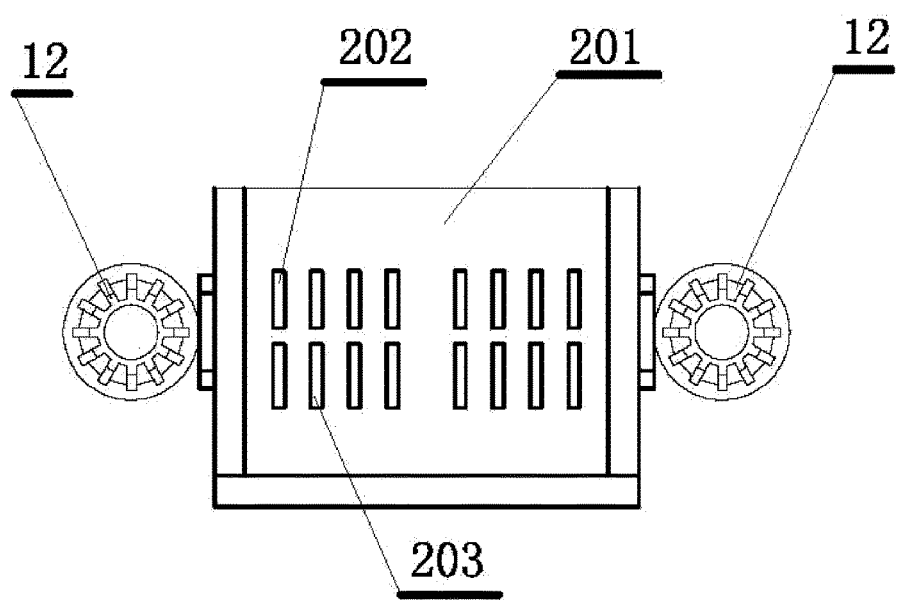
FIG. 3 shows the schematic diagram of the lateral structure of the push bag plate of the invention.

A biomimetic bag opening device for the automatic filling line, as shown in FIGS. 1 to 5, the device include brackets 2 left and right symmetrically arranged and mounted on the filling line for the filling bags 1, the symmetrically arranged brackets moving back and forth in a horizontal relative motion respectively driven by a pull rod, wherein, the push bag plate 201 facing the filling bag provided at a front end of the brackets, a row of gripper holes 202 and 203 provided on the push bag plate in the upper and lower of the horizontal level respectively, the gripper holes are vertical elongated holes, the horizontal spacing between holes is 3 cm-5 cm, the hole width of the elongated holes is 1 cm to 2 cm, and two rows of grippers provided on the brackets behind the push bag plate and corresponding to the two rows of gripper holes, a gripper drive device driving two rows of grippers open or closed, and the grasping fingertips of the grippers projecting or retracting from two rows of the upper and lower of the gripper holes; the front end of the grasping fingertip is arranged at an acute angle of less than 30 degrees, two gripping fingertips are downwards and upwards folded together respectively after projecting out from the holes, and its projecting distance can just maintain one of the two woven bags.

In the embodiments, the gripper drive device comprises an active gripping arm 3 and a driven gripping arm 4 connected to the gripper, and a swing arm 6 driven by a drive arm 5, the swing arm with one end fixedly connected to a first shaft 7, the first shaft rotated with the swing of the swing arm, a row of gripping arms fixedly mounted on the first shaft, referred to as active gripping arms 3, also a drive gear 8 provided on the first shaft, a second shaft 9 provided parallel to the first shaft, a row of gripping arms fixedly mounted on the second shaft, referred to as the driven gripping arms 4, a driven gear 10 provided on the second shaft and corresponding to the drive gear, the drive gear and the driven gear engaged with each other, the swing arm driven by the drive arm to rotate the first shaft, the driven gear rotated by the drive gear of the first shaft, the second shaft rotated by the driven gear, the active gripping arm and driven gripping arm driven open or closed by the rotation of the first shaft and second shaft.

In the embodiments, the drive arm is connected to a cylinder push arm 11 or the cylinder push arms or push arms powered by an electrical motor, and a cylinder is used in this embodiment. Since the swing arm swings in an arc, the cylinder is secured to the bracket by the means of hinge. When the cylinder push arm drive the swing arm to swing in an arc, the cylinder follows to move and may not be stuck.

In the embodiment, for further grasping the filling bags, the two sides of the push bag plate on one side of the brackets at both sides are respectively arranged with auxiliary suckers 12 facing the filling bags, a air pump is connected behind the sucker; wherein the sucker face of the auxiliary sucker is retracted into the plane of the push bag plate.

As an optimal solution, the sucker face of the auxiliary sucker is retracted into the plane of the push bag plate by 2 mm to 4 mm.

Figure 5:
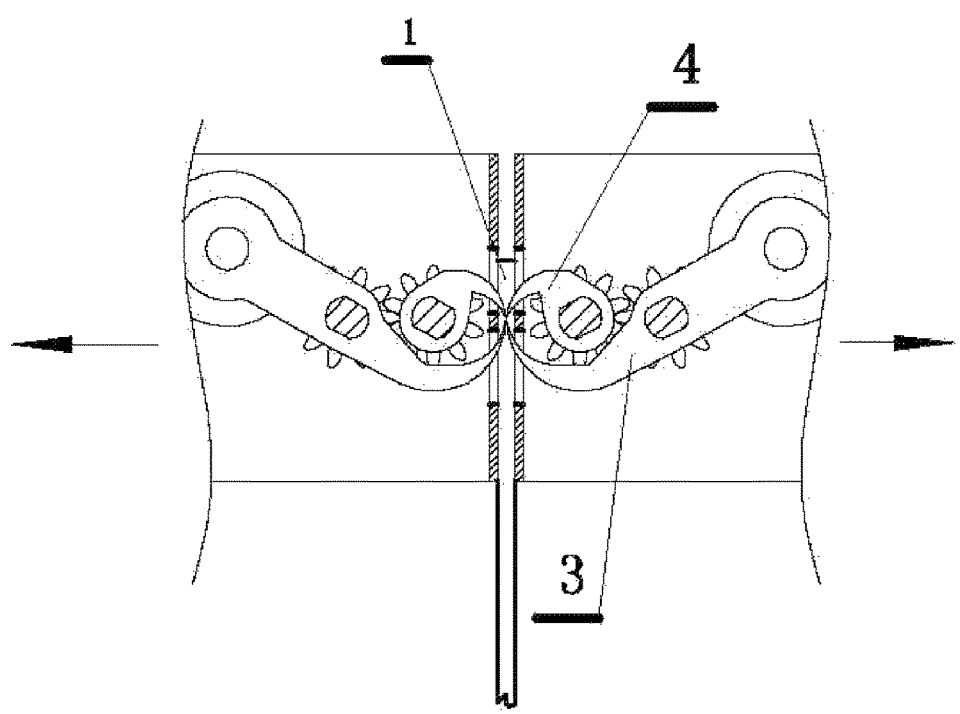
FIG. 5 shows the schematic diagram of the operating state of the invention.

When the device is operated and the woven bags are approaching on the front end of the bag opening device, the woven bags are pulled near to the push bag plate on one side of the bracket by the auxiliary suckers, the brackets at both sides folded toward the middle, and now it starts to operate by the cylinder assembly mounted to the cylinder bracket assembly (micro-swing motor may be utilized instead), the cylinder shrinks to drive the active gripper arm to move clockwise, the first shaft is rotated as the active gripper arm moves, and the drive gear and the driven gripper arm are driven by the first shaft to rotate; the drive gear is engaged with the driven gear, therefore, the driven gear is rotated counterclockwise, the second shaft rotated by the driven gear, and the driven gripper arm driven by the second shaft, such that the gripper is rotated out of the outside of the push bag plate from the inside of the push bag plate to grip the material woven bags. Then, the bag opening action of the material woven bags is completed by the relative motion as shown in the arrows of FIG. 5.

Figure 4:
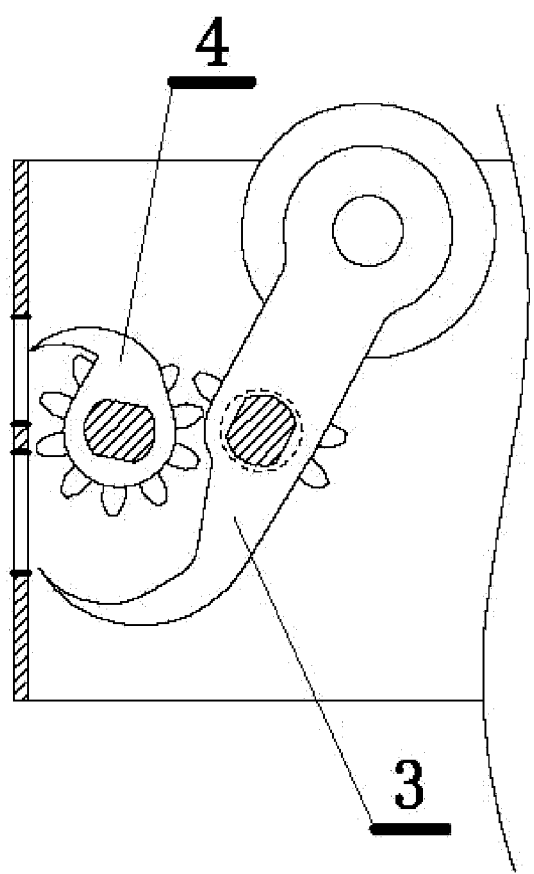
FIG. 4 shows the schematic diagram of the gripper being open of the invention, which is the view of FIG. 2A-A.

The woven bags are filled with materials after being open, followed by that the cylinders of the bag opening device assembly are projected to drive the active gripper arm to move clockwise, the first shaft is driven to rotate as the active gripper arm moves, and the drive gear and driven gripper are driven to rotate by the first shaft; the drive gear is engaged with the driven gear, therefore, the driven gear is rotated clockwise, the second shaft is rotated by the driven gear, the driven gripper arm is driven by the second shaft, such that the gripper is rotated out of the inside of the push bag plate from the outside of the push bag plate (as shown in FIG. 4) to release the material woven bags. The filling operation is completed since warp/weft woven strips of the push bag plate for blocking the material woven bags are completely detached from the grippers.

What is claimed is:

1. A biomimetic bag opening device for an automatic filling line, comprising:
   a pair of brackets symmetrically arranged on two sides of the filling line for filling bags, wherein the symmetrically arranged brackets move towards or away from each other when in use;
   a push bag plate facing a filling bag provided at a front end of each of the brackets, wherein a first row and a second row of gripper holes are provided on the push bag plate in a direction along the filling line, and the first row of gripper holes and the second row of gripper holes are vertically aligned;
   a first row and a second row of grippers provided on each of the brackets behind the push bag plate, wherein the first row of grippers corresponds to the first row of gripper holes, the second row of grippers corresponds to the second row of gripper holes, and each of the grippers having a grasping fingertip; and
   a gripper drive device provided on each of the brackets, respectively, wherein the gripper drive device drives the first row and the second row of grippers to open or close, and the grasping fingertips of the grippers project or retract from the first row and the second row of gripper holes.

2. A biomimetic bag opening device for the automatic filling line according to claim 1, wherein the gripper drive device comprises a swing arm driven by a drive arm, a first shaft and a second shaft; wherein:
   one end of the swing arm is fixedly connected to the first shaft, the first shaft rotates with the swing of the swing arm, a row of active gripping arms are fixedly mounted on the first shaft, and a drive gear is provided on the first shaft, wherein each of the active gripping arms is connected to a corresponding gripper in the first row of grippers;
   the second shaft is provided parallel to the first shaft, a row of driven gripping arms are fixedly mounted on the second shaft, a driven gear is provided on the second shaft corresponding to the drive gear, and the drive gear and the driven gear are engaged with each other, wherein each of the driven gripping arms is connected to a corresponding gripper in the second row of grippers; and
   wherein, when in use, the swing arm is driven by the drive arm to rotate the first shaft, the driven gear is rotated by the drive gear of the first shaft, the second shaft is rotated by the driven gear, the active gripping arms and the driven gripping arms are driven open or close by the rotation of the first shaft and second shaft.

3. A biomimetic bag opening device for the automatic filling line according to claim 2, wherein the drive arm is connected to one cylinder push arm or cylinder push arms or push arms driven by an electrical motor.

4. A biomimetic bag opening device for the automatic filling line according to claim 1, wherein two auxiliary suckers are provided at one of the brackets, which are arranged on two sides of the push bag plate and face the filling bags.

5. A biomimetic bag opening device for the automatic filling line according to claim 4, wherein a sucker face of the auxiliary suckers is retracted into a plane of the push bag plate.

6. A biomimetic bag opening device for the automatic filling line according to claim 5, wherein, the sucker face of the auxiliary suckers is retracted into the plane of the push bag plate by 2 mm to 4 mm.

\* \* \* \* \*